United States Patent
Israel

[11] Patent Number: 5,553,786
[45] Date of Patent: Sep. 10, 1996

[54] LOW VOLUME IRRIGATION DEVICE FOR HORTICULTURE AND AGRICULTURE CROPS

[76] Inventor: Chermoni Israel, 20, Shoham Street, Haifa, Israel

[21] Appl. No.: 278,215

[22] Filed: Jul. 21, 1994

[30] Foreign Application Priority Data

Jul. 28, 1993 [IL] Israel ........................... 106510

[51] Int. Cl.⁶ ................. B05B 1/12; B05B 1/32; B05B 1/26
[52] U.S. Cl. ............... 239/456; 239/542; 239/507; 239/514; 251/216; 251/126
[58] Field of Search .............. 239/514, 505–507, 239/461, 537–539, 542, 379, 302, 271, 456–458, 451, 541, 547, 562, 567, 579, 581.2, 581.1; 251/216, 126, 121; 137/625.3

[56] References Cited

U.S. PATENT DOCUMENTS

| | | | |
|---|---|---|---|
| 1,021,055 | 3/1912 | Lewry | 251/216 |
| 1,527,222 | 2/1925 | Rasmussen | 239/514 |
| 2,723,879 | 11/1955 | Martin | 239/458 |
| 3,102,691 | 9/1963 | Gall | 239/539 |
| 3,116,880 | 1/1964 | Kuiken | 239/539 |
| 3,891,150 | 6/1975 | Hoff et al. | 239/547 |
| 4,123,006 | 10/1978 | Yukishita | 239/266 |
| 4,195,780 | 4/1980 | Inglis | 239/457 |
| 4,722,481 | 2/1988 | Lemkin | 239/539 |
| 4,752,031 | 6/1988 | Merrick | 239/457 |

FOREIGN PATENT DOCUMENTS

| | | | |
|---|---|---|---|
| 50650 | 5/1979 | Israel . | |
| 499063 | 11/1954 | Italy | 251/216 |

Primary Examiner—Andres Kashnikow
Assistant Examiner—Lesley D. Morris
Attorney, Agent, or Firm—Lowe, Price, LeBlanc & Becker

[57] ABSTRACT

A spray and drip irrigation device connectable to a low volume irrigation tube comprises a lower member connected to the irrigation tube and formed with an exterior thread along a part of its outer surface along which an upper member threadedly moves to selectively cover an outlet orifice in the lower member to control the type of water flow from the device. A brim formed in the upper member cooperates with the outlet orifice in the lower member to enable the device to operate in drip, spray, and squirt modes.

10 Claims, 10 Drawing Sheets

LOW VOLUME IRRIGATION DEVICE FOR HORTICULTURE AND AGRICULTURE CROPS

FIELD OF THE INVENTION

The present invention relates to a low volume irrigation device for horticulture and agricultural crops. The device according to the present invention is inserted along an irrigation tube in required locations.

More specifically the present invention relates to a low volume irrigation device which is inserted along the irrigation tube in a required location and can be utilized as a drip device, spray device or as a squirt device, and whereby it is possible to adjust the drip, spray or squirt rate easily and conveniently in each and every device along the irrigation tube and to determine independently for each device the spray characteristics such as sector, height and distance. The present invention also relates to a combination of the device with a fertilizer container.

BACKGROUND OF THE INVENTION

In low volume irrigation of horticulture and agricultural crops, known devices are mainly drippers and spray devices which are fixed along an irrigation tube that lies on the ground. Acceptable irrigation tubes are made of rigid, semi-rigid or flexible plastic. In the dripper device field there are known different and varied types of drip openings/devices that are fixed along the irrigation tube at regular intervals. In the drippers known today the output of water passing through each drip unit along the tube is uniform and dependent upon the water pressure in the tube. In the known devices regulation of dripping rate can be done only by uniform regulation of dripping rates along the tube, so that individual and independent regulation of each drip unit is not possible.

There are devices for regulation of water flow in the irrigation tube but they are not specific to each dripping point but to the tube as a whole (see e.g., Israeli patent 50650).

An object of the present invention is to provide a dripper device in which the amount of water discharged per time unit is easily and simply adjusted to meet gardening requirements at each and every drip device. Therefore in horticulture and agricultural crops it is possible to provide each and every sit and plant with different amounts of water per time unit according to the individual plant need. The individual dripping differs in rate at each site and leads to a more efficient utilization of a given amount of water, resulting in water savings.

Known today are also low volume spray units connected to or inserted in an irrigation tube, e.g., U.S. Pat. No. 4,123,006. In this U.S. patent it is not possible to adjust sector, height and distance characteristics for each spray unit. Moreover, the spray device cannot be used as a dripper.

SUMMARY OF THE INVENTION

The present invention provides a spray device connected to the irrigation tube by insertion, and is easily and conveniently operated and its spray characteristics of height, sector, distance and water amount per time unit are easily adjusted. Moreover, the spray characteristics may not only be easily and simply adjusted via screw motion, the same device may also be changed into an adjustable rate-changing dripper or a squirt device. Also, the drip unit according to the invention may be changed back to a spray unit by simply and easily rotating a screw in an upper part of a cap associated with the device.

The present invention relates to a spray, squire and drip irrigation device that can be connected to a water tube in a low volume irrigation system. The device comprises an upper member and a lower member having a connection axle for connecting the members together. A round, o-shaped stopping rubber band tightly hugs the connecting axle of the lower member through which changes in dripping rate are accomplished.

The lower member is inserted or connected to the irrigation tube and serves as a water conduit from the irrigation tube to an outlet orifice in a center portion of the lower member. The upper member threadedly engages the lower member in such a way that the degree of screwing down affects the interaction of the upper member with the orifice and sealing band to enable either complete sealing of the device (through the pressure of the upper member on the sealing band), or achievement of dripping, squirting or spraying made with different characteristics.

The lower member comprises an inlet orifice located at a bottom thereof, and outlet orifice intersecting the connecting axle and an axial water passage connecting the inlet to the outlet. At the outlet zone portion, the axial passage is inclined in an upward angle towards the orifice.

A screw thread between the upper and lower members enables the upper member to be raised and lowered via lower member. A peripheral projection (hereinafter called: "a flange") is located on the lower member, underneath the screw-thread zone and elevationally below the outlet orifice. The stopping band is disposed on the flange in sealing contact with the lower member connecting axle. The function of the stopping band is to either completely stop the water passage or control the drip rate of water outwards from the flange water collecting surface, i.e., wherein the underside, i.e., a bottom surface of a peripherally projecting lower part, or cap, of the upper member (when screwed down) contacts the flange upper surface. The band may be made of any accepted, flexible, water-proof material. When fully sealed, the horizontal and level under surface of the cap presses down on the stopping band. In order to change into drip mode the cap is slightly raised by screwing up the upper member so that the pressure on the stopping band is relieved. The flange upper surface is formed as an upward facing recess, thus creating a water collecting surface that facilitates water collection and dripping.

The pointed lower extremity (preferably there should be a slight projection or barb above it to prevent it from slipping out of the irrigation tube) is adapted to be inserted in and anchored to the irrigation tube, and includes the lower orifice zone.

The upper member screws down and over the lower member. The upper member comprises a central cylindrical cavity with an inner screw-thread therealong. This cavity is open at the bottom and rises up to a certain height to receive the connecting axle and thereby screw over and cover the lower member. The cap located at the lower end of the upper member provides the horizontal and level under-surface and also defines a wide brim at its peripheral edge of constant or changing circumference, to regulate the sector, height, distance and spray pattern.

Other objects and features of the invention will become apparent from the following detailed description of one embodiment thereof presented in conjunction with the accompanying drawings. These drawings are not intended to limit the scope of said invention in any way but are for demonstration and explanation only.

DETAILED DESCRIPTION OF THE DRAWINGS

Figure 1:
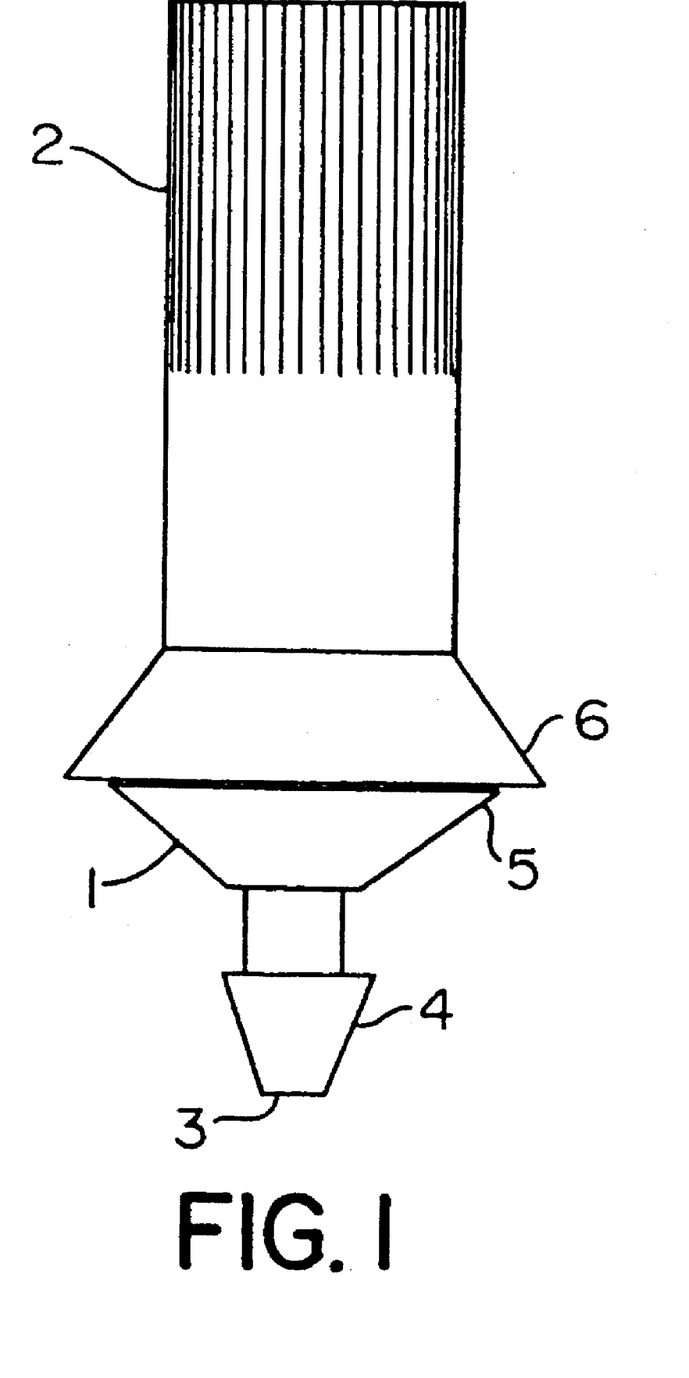
FIG. 1: is a side view of the device in a closed state or in dripping mode.

FIG. 1 is a side view of the device in a closed state. The device has a long cylindrical shape and comprises a lower member (1), and upper member (2) and a stopping band (not visible in this figure). The lower member (1) includes an inlet orifice (3) for water inflow from an irrigation tube and a pointed bottom extension (4) for insertion in and anchorage to the tube. An annular flange (5) as formed at an upper end of lower member (1) is adapted to sealingly engage a wide brimmed cap (6) located at the lower end of the upper member (2) to prevent water flow therebetween in the full screwed down (i.e., closed) state when a stopping band (14) is pressed between them.

Figure 2:
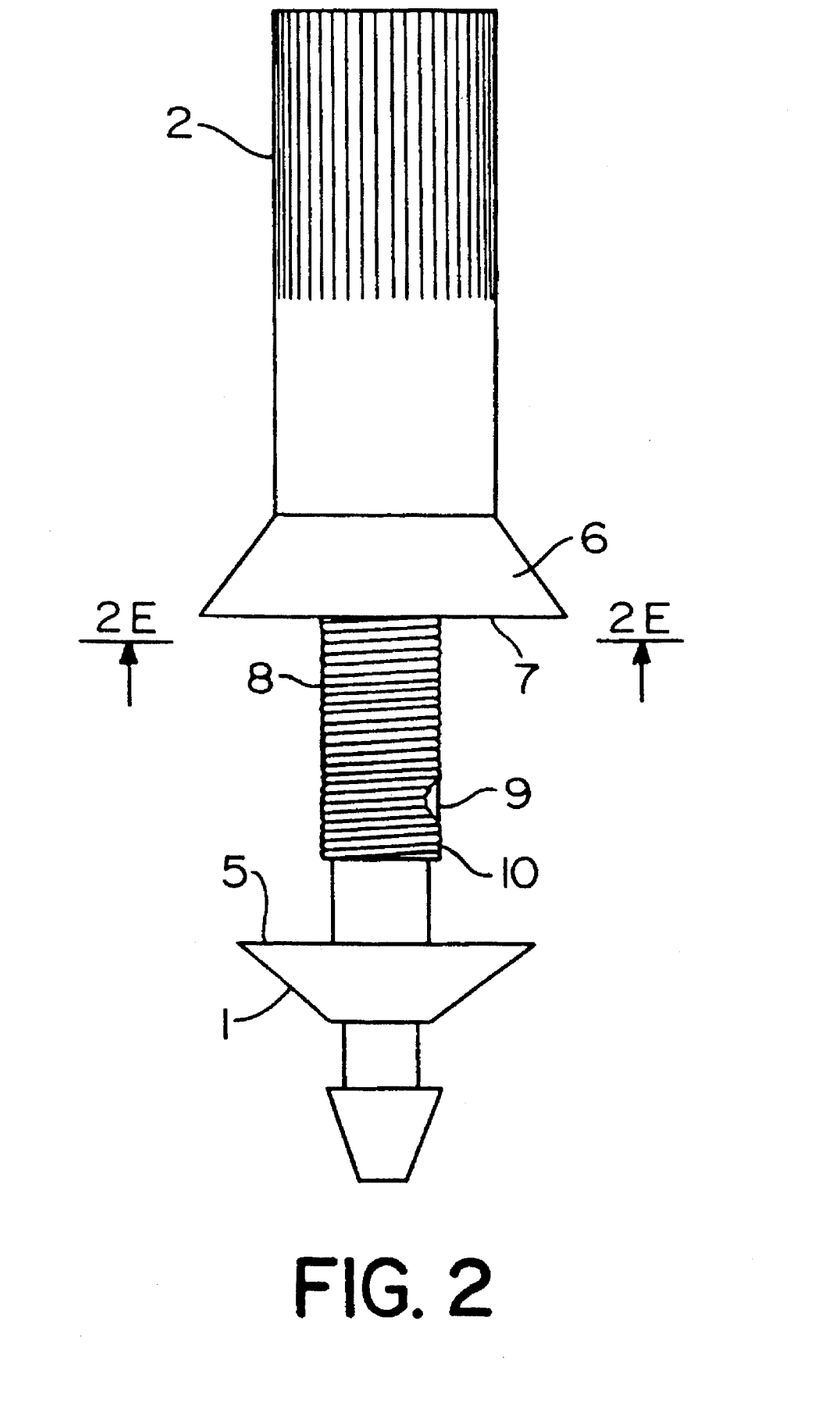
FIG. 2: is a side view of the device in an opened state in spray mode.
Figure 2A:
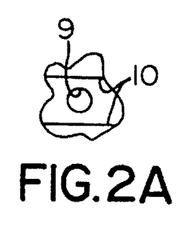
Figure 2B:
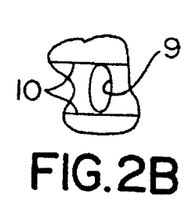
Figure 2C:
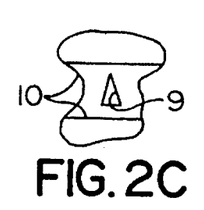
Figure 2D:
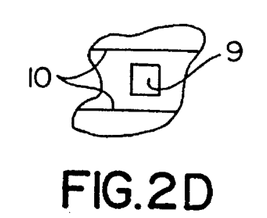
Figure 4:
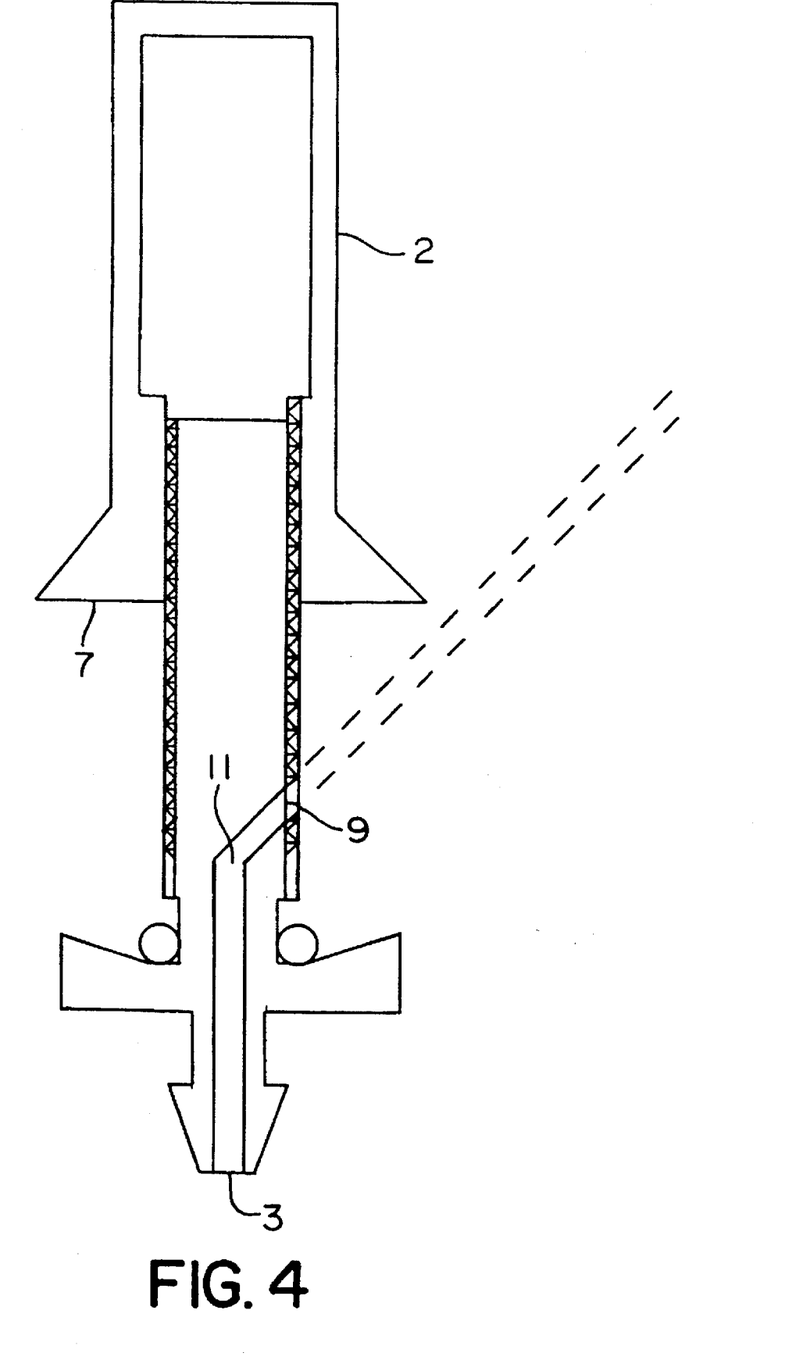
FIG. 4: is a longitudinal section of the device in open state in squirt mode.

If the upper member (2) is not screwed tightly down to generate complete stoppage, the device functions as a dripper. In drip-mode, the water flows out of the outlet orifice (9), down the screw-thread ridges (8) and collects on the upper surface of flange (5) where it overflows and drips out. FIG. 2 is a view of the outer surface of the device in the open state. The lower part (7) of the cap (6) overlies the screw-thread zone (8) of the lower member (1) and is screwed down a little. The water outlet orifice (9) is located in zone (8) and may be formed in various shapes as necessary—circular, elliptical, triangular, square-shaped or any other polygonal shape, such as depicted in FIGS. 2A–2D. Flange (5) serves as a water collection surface and a dripping surface and is located underneath this orifice. Lying on it and hugging the axle is the stopping ban (14) which can be made of any accepted flexible waterproof materials. In the partially closed position (see FIG. 5) the water flows slowly down towards the flange (5) from the orifice (9) along the screw-thread (10) beneath the orifice. In this figure, the irrigation is in the form of a drip, with FIG. 4 depicting squirt mode.

Figure 2E:
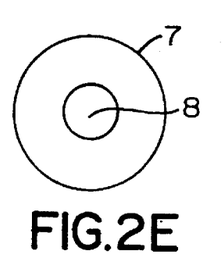
Figure 2F:
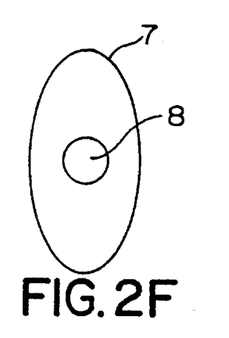
Figure 2G:
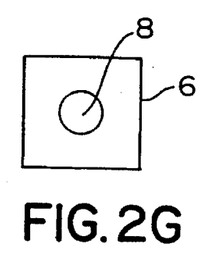

FIGS. 2A–2D are illustrations, in elevation, depicting various shapes of outlet orifices for use in the invention;

FIGS. 2G–2F are illustrations of different shapes of a cap brim used in the invention.

Figure 3:
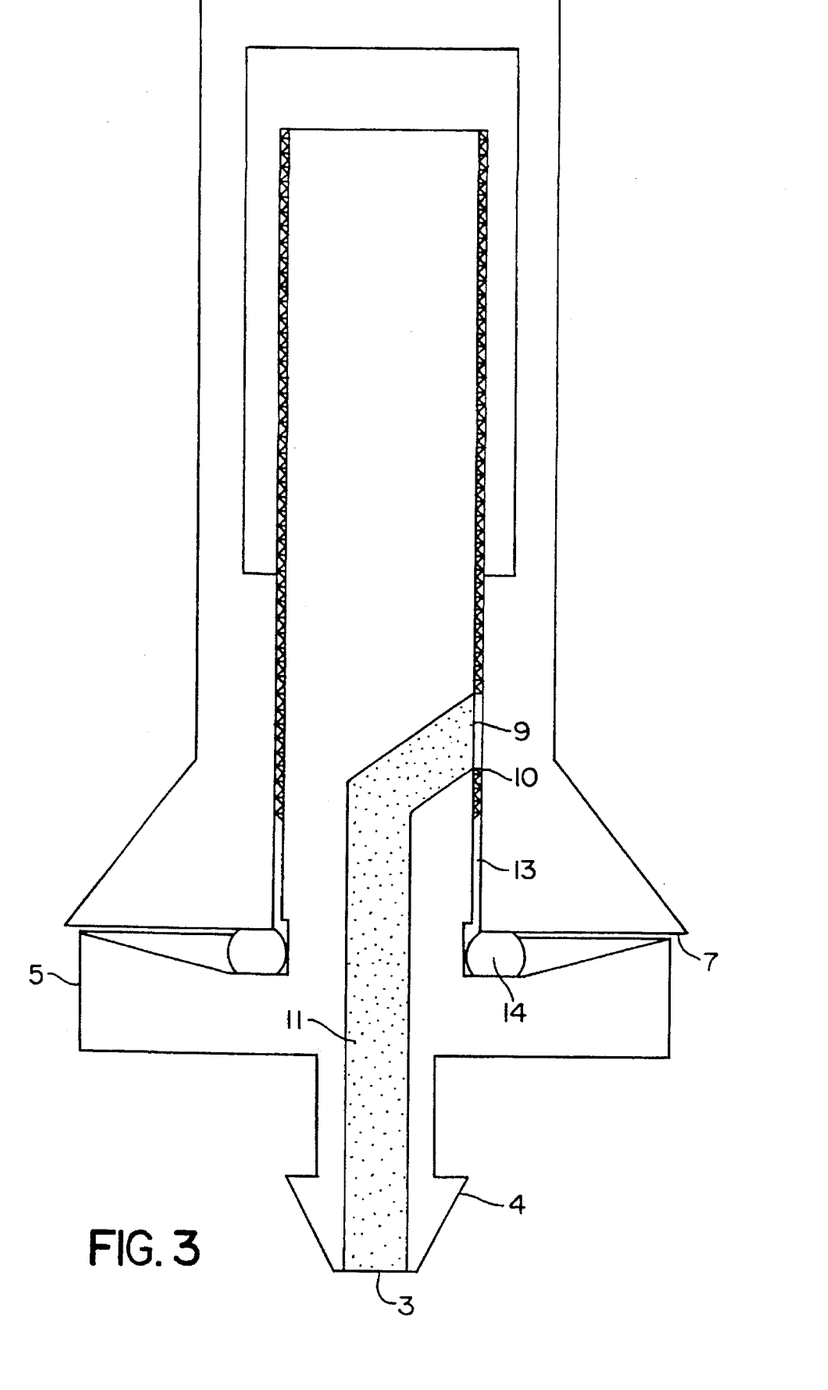
FIG. 3: is a longitudinal section of the device in fully closed state.

FIG. 3 is a side view of the device of FIG. 1 completely closed in longitudinal section.

Figure 5:
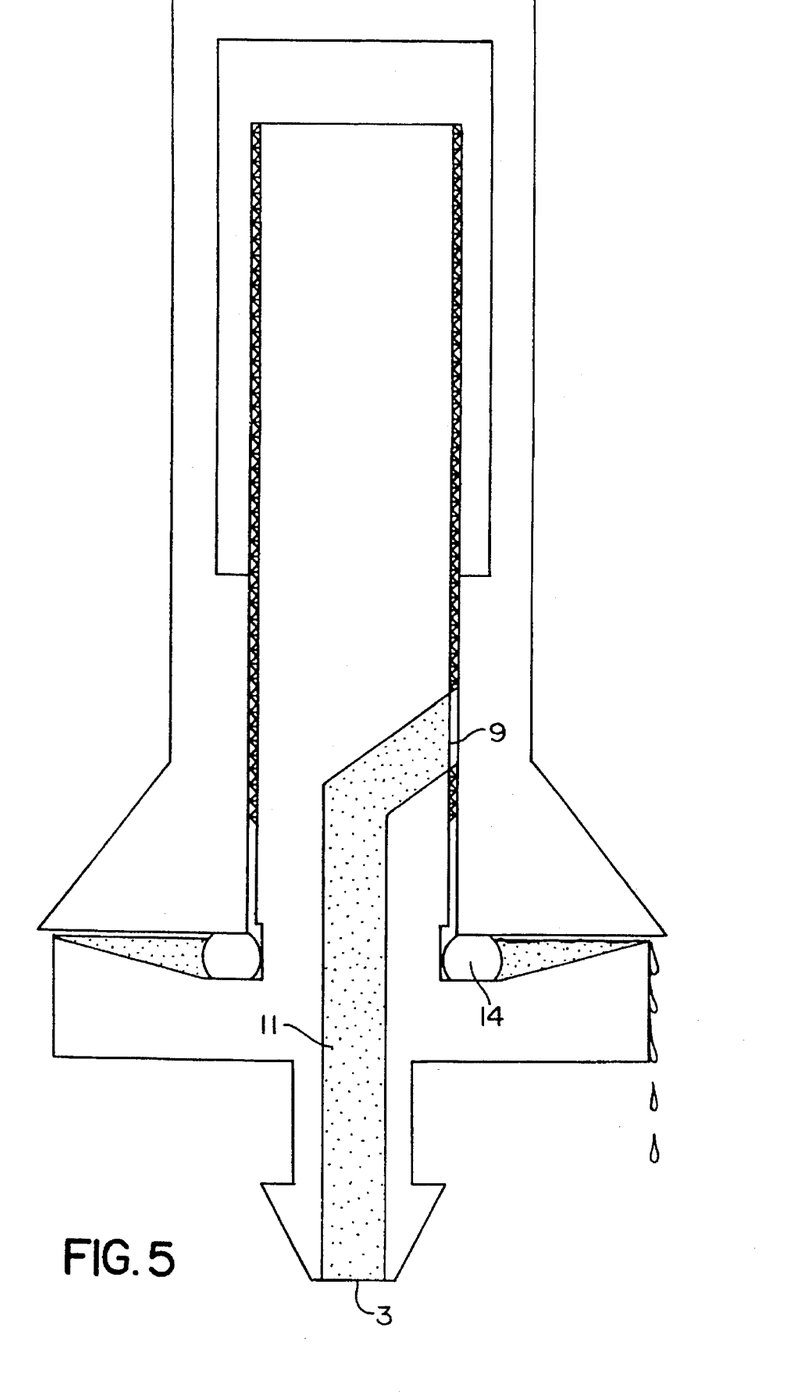
FIG. 5: is a longitudinal section of the device in open state in drip mode.

The undersurface (6a) of cap (6) is horizontal and level and, when the device is fully closed, the undersurface presses on the stopping band (14) lying on the flange (5) thereby preventing water from collecting on the tray, overflowing and dripping out. The insertion extension (4) of the device is inserted in the irrigation tube so that water enters through the orifice (3) and passes through the inner hollow passage (11) to the outlet orifice (9). From the orifice the water slowly flows out along the spaces between the screw-thread ridges (10) and along the space (13) between the upper member (2) and the lower member (1) (FIG. 3) until it reaches the centrally declining surface of the flange (5) where it is stopped by the stopping band (14). A slight lifting of the upper member (1) by screwing it upwards eases the pressure on the stopping band (14). The stoppage caused by the band (14) is thus removed and dripping towards the ground occurs (FIG. 5). Drip output depends on the size of this space.

FIG. 4 is a side view in longitudinal section of the device in the open state as also depicted in FIG. 2. The upper member (2) is screwed down only slightly, thereby leaving the outlet orifice (9) functioning as a spray orifice uncovered. In this form the device functions as a squirt. Water squirts out in an upward angle (the exit path is traced in dotted line). The water flows into the device from the irrigation tube through the inlet orifice (3) and flows through the axial passage (11) within the lower member (1). This water passage turns in an upward angle towards the outlet orifice (9) so that the water bursts out in a defined upward angle. Lowering the brim (7) of cap (6) causes a spray (see FIG. 6). The spray pattern and range are defined by the size and shape of the orifice (9). Moreover, the brim (7) (the bottom horizontal surface of the upper member (1)) also defines the sector, height and distance characteristics of the spray, since by screwing down and lowering the upper member to the appropriate height, part of the original squirt breaks into a spray. FIG. 4 shows in side view the device in a squirt mode since the water jet does not touch the brim (7).

FIG. 5 describes the device in drip mode. The water enters the device through the inlet orifice (3) and passes through the axial passage (11) within the lower member (1). This water passage opens towards the outlet orifice (9) from which the water drips out and slowly flows along the screw-thread ridges and through the spaces between the upper and lower members (2,1). since there is no pressure on the band (14) the water is not stopped and therefore collects on the upper surface of flange (5) to drip outwards to the ground. Screwing down the upper member (2) to lower the underface of cap (6) will diminish the dripping until the pressure up on the stopping band (14) results in full stoppage, as depicted in FIG. 3.

Figure 6:
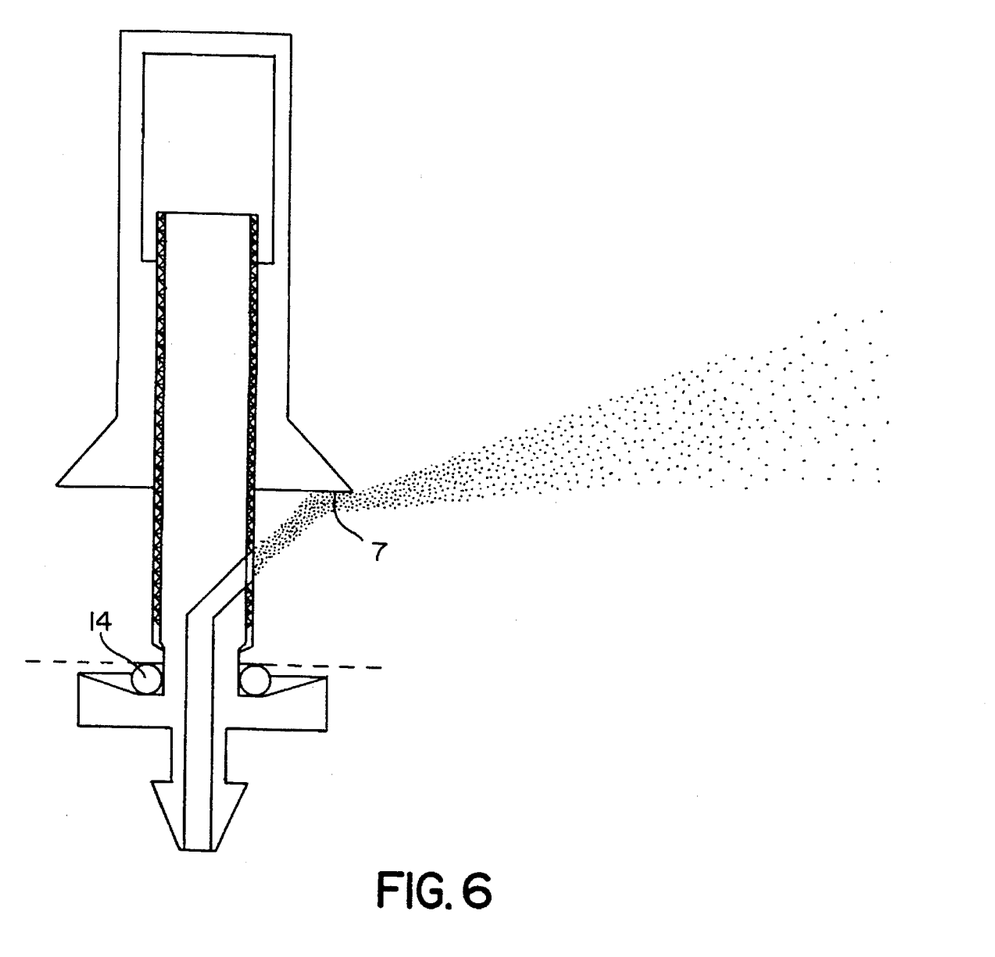
FIG. 6: is a longitudinal section of the device in open state in spray mode.

FIG. 6 is an illustration of the device in spray mode. Whereas FIG. 4 depicts the device in squirt mode, in FIG. 6 the water hits and breaks on the brim (7) of cap (6) thus creating a spay or a mist spray whereby the sector, height and distance characteristics of said spray are not only determined by the shape of the outlet orifice but also by the brim shape (circular, elliptical, polygonal and so forth), such as depicted in FIGS. 2E–2G. Lowering the brim (7) until it is underneath the outlet orifice (9) causes the spray to cease and dripping to start. When the cap brim (7) is significantly raised to the position shown in FIG. 4, the flow of water becomes a squirt since the water no longer strikes the cap brim (7).

Figure 7:
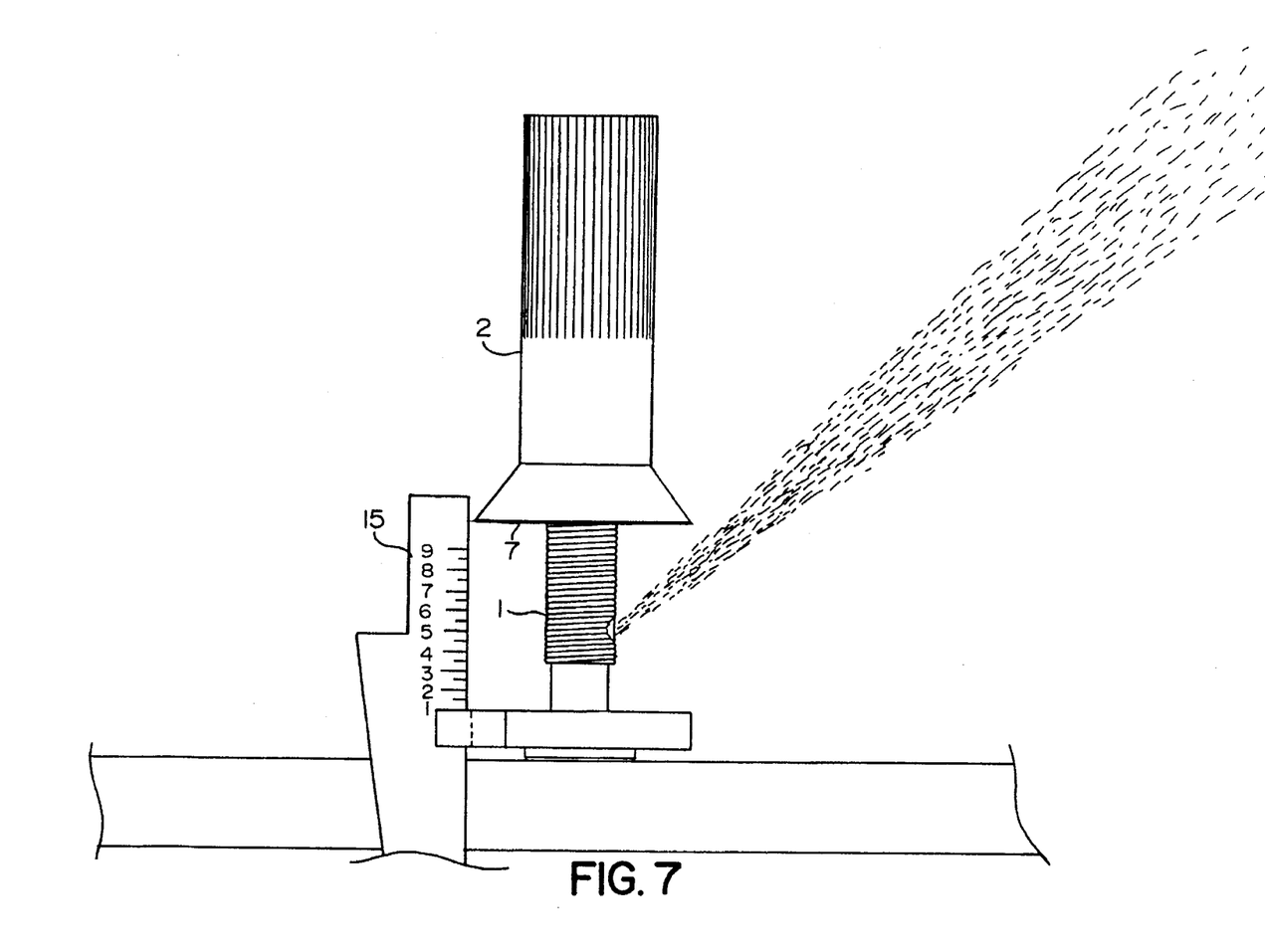
FIG. 7: is a side view of the device inserted in an irrigation tube, including a regulation scale for determining the water output whereby the scale supports the device.

FIG. 7 is a side view of the device, according to the invention, including a scale (15) for regulation of the irrigation's mode and pattern connected separately or integrated with the lower member. The attached regulation scale makes it possible to pre-determine the water output and mode of the irrigation (changing drip, spray, squirt, mist spray) both which depend only on the degree of screwing down of the upper member (2) over the lower member (1) and on the shape of the cap brim (7).

Figure 8:
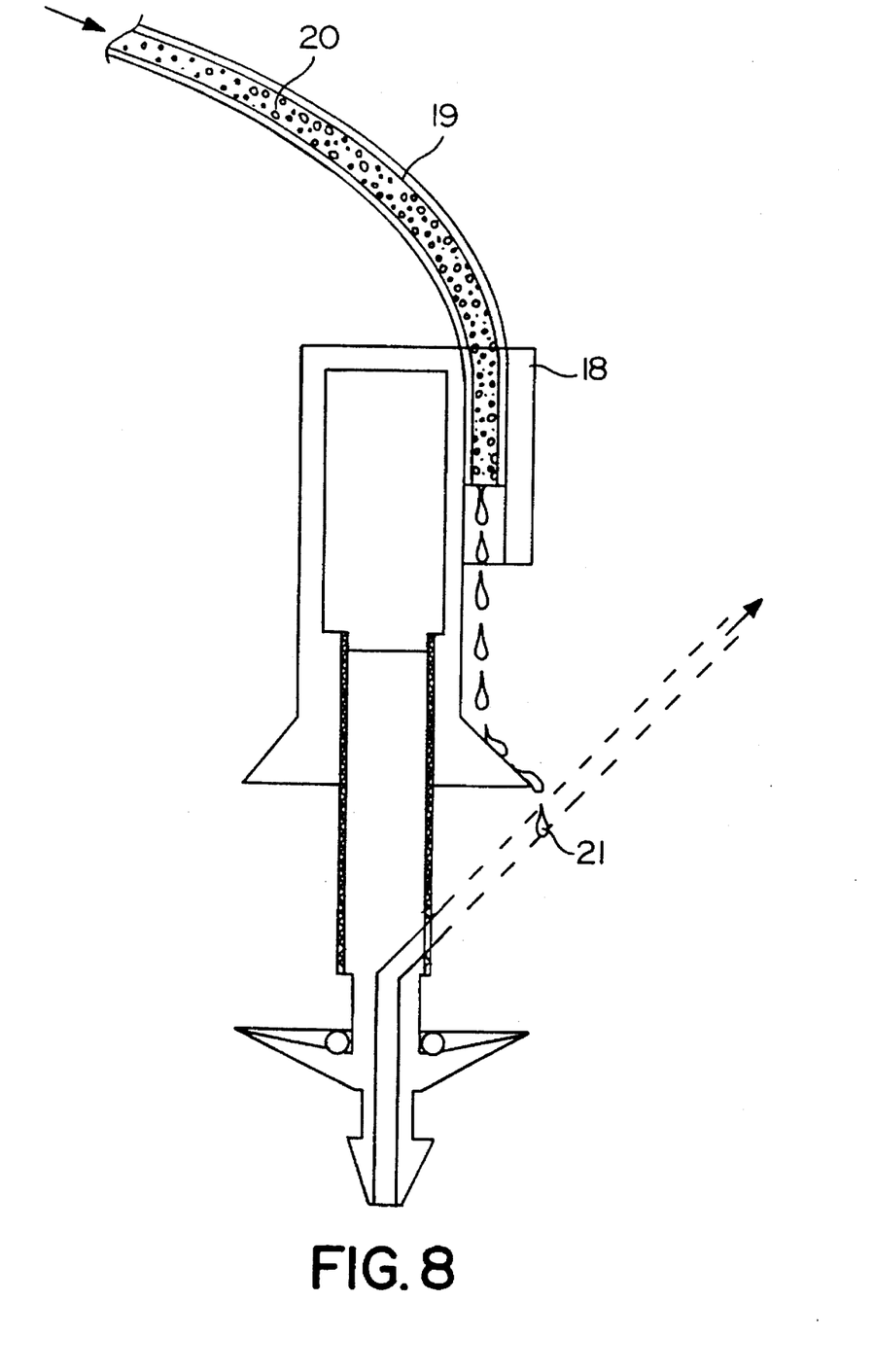
FIG. 8: is a view of the device with a connector to a fertilizer carrying tube.

FIG. 8 describes the open device including a sleeve (18) adapted to hold a tube (19) carrying a fertilizing material (20). Sleeve (18) is fitted on the upper member (2) in such a way that the fertilizer drips or flows over the upper outer surface of cap (6), falling as drops (21) on the water spray emitted from the orifice and intermingling with it to provide a fertilizer containing spray.

Figure 9:
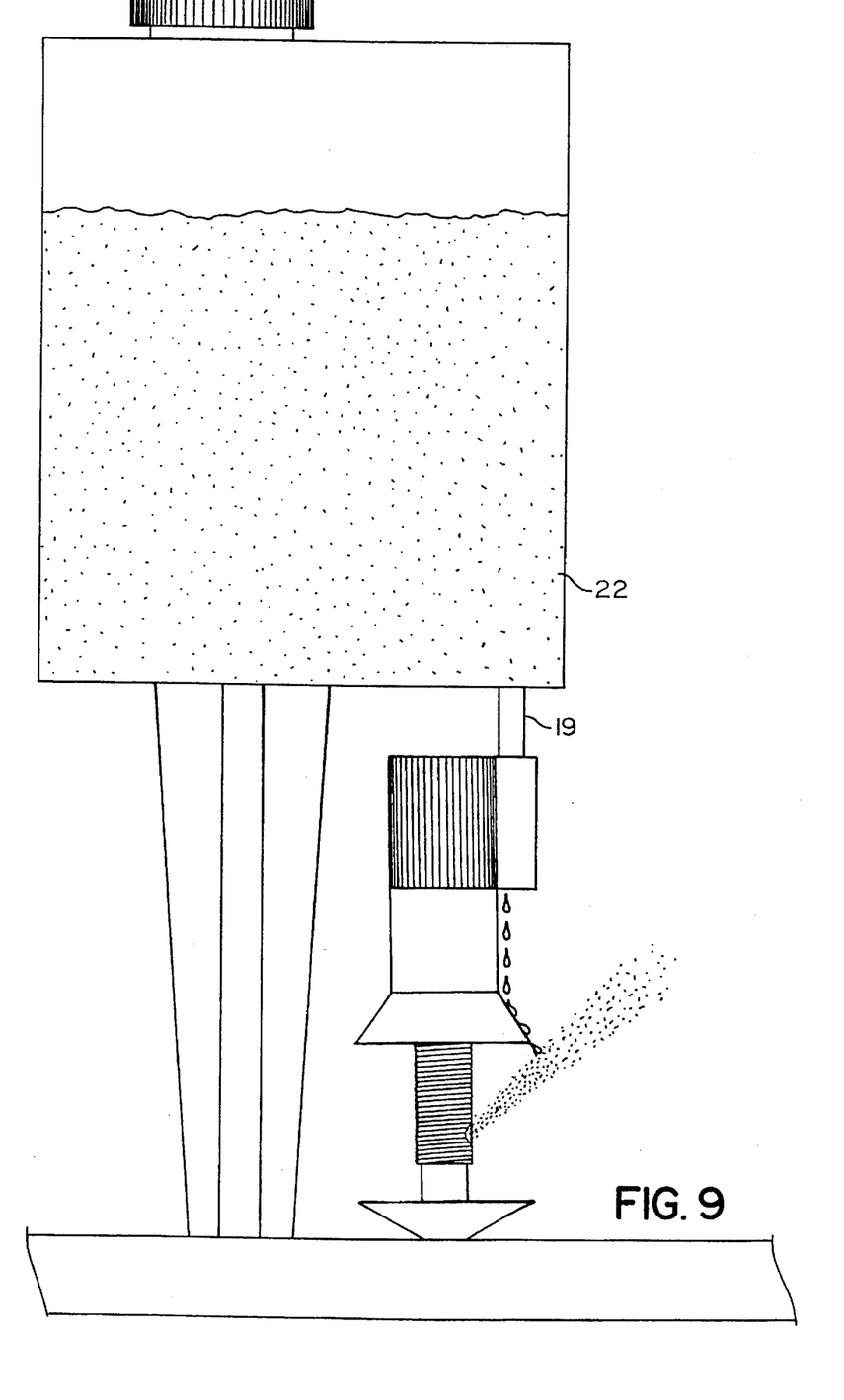
FIG. 9: is a view of the device in FIG. 7 with the fertilizer carrying tube connected to a fertilizing container.

FIG. 9 describes the device of FIG. 8 connected through the tube (19) to a fertilizer container (22). This container can be driven into the ground. There is full control over the amount of fertilizer and chemicals in each and every sprinkle-irrigation point and over the ratios in sprinkling in regard to said fertilization. The fertilizer and the chemicals bypass the water pipe system and there is no danger than an obstruction of fertilization will occur.

The invention has been described herein with reference to certain preferred embodiments. However, as obvious variations thereon will become apparent to those skilled in the art, the invention is not to be considered as limited thereto.

I claim:

1. A spray and drip-irrigation device connectable to a low volume irrigation tube, comprising: a lower member formed with a threaded section along an outer surface thereof and means for connecting said lower member to the irrigation tube, an upper member threadedly connected to the lower member and being moveable along the lower member through screwed rotation; a circular, o-shaped stopping band mounted to the lower member, wherein said lower member includes a water inlet orifice at a bottom portion thereof, an axial water passage extending through the lower member and being formed with an inclined, upward angled passage terminating in an outlet orifice, located within said threaded section, said lower member including a peripheral flange located below said threaded section for collecting a water flow discharged from the outlet orifice to enable said collected water to drip from said flange when said upper and lower members are in a predetermined position relative to each other, said stopping band being disposed on said flange, said upper member including a central cylindrical cavity being open at a bottom end thereof to receive the threaded section of the lower member, with walls of said cavity including threads for threaded engagement with said threaded section, said upper member further including a peripheral projection having a peripheral edge being moveable upon screwed rotation of the upper member, to contact a fluid flow ejected from the outlet orifice and thereby regulate section, height and distance of the spray.

2. A spray and drip irrigation device according to claim 1, further comprising a fertilizer carrying tube gripper fixed on the upper member.

3. A spray and drip-irrigation device according to claim 2, wherein said tube gripper as a hollow sleeve through which the fertilizer carrying tube extends.

4. A spray and drip irrigation device according to claim 3, wherein the fertilizer carrying tube is connected to a fertilizing container.

5. A spray and irrigation device according to claim 1, wherein the outlet orifice is shaped as one of a circle, ellipse, triangle, square and a polygon.

6. A spray and drip-irrigation device according to claim 1, further comprising a numbered scale, connected to the lower member, for measuring a volume of water passed through said device.

7. A spray and drip-irrigation device according to claim 1, wherein a circumference defined by the peripheral edge of the peripheral projection of the upper member is one of circular, elliptical and polygonal.

8. A spray and drip-irrigation device according to claim 1, wherein the outlet orifice is dimensioned to produce a mist spray.

9. A spray and drip-irrigation device according to claim 1, wherein the stopping band is made of a flexible waterproof material which stops the water passage from the device when the upper member presses down on the band with sealing force.

10. A spray and drip-irrigation device according to claim 1, wherein the drip output, spray output, and the output and pattern of the squirt irrigation mode and mist spray mode is determined by the extent to which the upper member is screwed down on the lower member.

* * * * *